United States Patent
Iijima

(10) Patent No.: US 7,265,782 B2
(45) Date of Patent: Sep. 4, 2007

(54) IMAGE RECORDING DEVICE WITH A POST-RECORDING FUNCTION

(75) Inventor: Jun Iijima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 636 days.

(21) Appl. No.: 10/404,526

(22) Filed: Apr. 1, 2003

(65) Prior Publication Data

US 2003/0189653 A1    Oct. 9, 2003

(30) Foreign Application Priority Data

Apr. 4, 2002  (JP)  ............................. 2002-102735
Feb. 26, 2003  (JP)  ............................. 2003-049246

(51) Int. Cl.
   H04N 5/76   (2006.01)
   H04N 5/225  (2006.01)
   H04N 5/93   (2006.01)
   H04N 5/91   (2006.01)

(52) U.S. Cl. .............................. 348/231.4; 348/220.1; 348/231.6; 386/54; 386/96

(58) Field of Classification Search ............ 348/231.4, 348/231.3, 220.1, 231.6; 386/96, 104, 102, 386/39, 54

See application file for complete search history.

(56) References Cited

U.S. PATENT DOCUMENTS 5,784,525 A    7/1998  Bell
6,128,037 A    10/2000 Anderson
6,504,575 B1 *  1/2003 Ramirez et al. ........ 348/333.02
6,683,649 B1 *  1/2004 Anderson .............. 348/333.05
6,774,939 B1 *  8/2004 Peng ........................ 348/231.4
6,850,273 B1 *  2/2005 Yoshida et al. ........... 348/231.3
6,952,230 B2 * 10/2005 Ejima et al. ............. 348/333.05
7,136,102 B2 * 11/2006 Misawa .................. 348/333.02
2003/0103148 A1 * 6/2003 Ejima et al. .............. 348/231.3

FOREIGN PATENT DOCUMENTS

| JP | 4-78279 A   | 3/1992 |
| JP | 7-322195 A  | 12/1995 |
| JP | 11-46339 A  | 2/1999 |
| JP | 2001-285757 A | 10/2001 |
| JP | 2003-234993 A | 8/2003 |
| WO | WO97/14249  | 4/1997 |

* cited by examiner

*Primary Examiner*—Ngoc-Yen Vu
*Assistant Examiner*—Nicholas G. Giles
(74) *Attorney, Agent, or Firm*—Frishauf, Holtz, Goodman & Chick, P.C.

(57) ABSTRACT

A digital camera comprises a CCD, sample-and-hold circuit, analog to digital converter, color processing circuit, microphone, voice processing section, flash memory in which voices input from the microphone are arbitrarily added to still images and the still image data with the voice data is recorded, a key input section which selects an arbitrary still image among the still images recorded in the flash memory, and a CPU which discriminates whether or not voices are added to selected still-images. A message for alarming is displayed on a display section when the voices are added to the images.

19 Claims, 8 Drawing Sheets

FIG. 2

| FILE No. | FILE STORING AREA |
|---|---|
| 1 | STILL-PICTURE-WITHOUT-VOICES FILE |
| 2 | VOICE MEMORANDUM FILE |
| 3 | STILL-PICTURE-WITH-VOICES FILE |
| 4 | MOVIE FILE |
| ⋮ | ⋮ |
| m | |

IMAGE RECORDING DEVICE WITH A POST-RECORDING FUNCTION

CROSS-REFERENCE TO RELATED APPLICATIONS

This application is based upon and claims the benefit of priority from the prior Japanese Patent Applications No. 2002-102735, filed Apr. 4, 2002 and No. 2003-049246, filed Feb. 26, 2003, the entire contents of both of which are incorporated herein by reference.

BACKGROUND OF THE INVENTION

1. Field of the Invention

The invention relates to a device and a method for image recording which can be used for a digital camera with a post-recording function and the like.

2. Description of the Related Art

Conventionally, an electronic still camera which has, in addition to a usual still-picture pick-up function, a function of picking-up still-pictures with voices, by which voices obtained by sound-recording operation before and after the timing when still pictures are picked-up are recorded at a point of picking-up still pictures such that the voices are in relation with still images obtained by picking-up operation of still pictures, has been known.

Moreover, there have been requirements to record voices by sound-recording operation for still images, which have been already recorded in a memory, at arbitrary timing after still pictures are picked-up, that is, to execute the post-recording.

BRIEF SUMMARY OF THE INVENTION

According to an embodiment of the present invention, an image recording device comprises a memory which stores image data, an instruction unit configured to issue an instruction at an arbitrary timing such that voice data is related to the image data stored in the memory, a discrimination unit configured to discriminate whether voice data has already been related to the image data when the instruction is issued, and a notifying unit configured to notify that the voice data has already been related to the image data when it is discriminated that the voice data has already been related to the image data.

According to another embodiment of the present invention, a digital camera comprises an image pickup unit which obtains image data, a memory which stores the image data obtained by the image pickup unit, an instruction unit configured to issue an instruction at an arbitrary timing such that voice data is related to the image data stored in the memory, a discrimination unit configured to discriminate whether voice data has already been related to the image data when the instruction is issued, and a notifying unit configured to notify that the voice data has already been related to the image data when it is discriminated that the voice data has already been related to the image data.

According to still another embodiment of the present invention, an image recording method comprises giving an instruction at arbitrary timing such that voice data is related to image data which has been stored in a memory, discriminating whether voice data has already been related to the image data when the instruction is issued, and notifying that the voice data has already been related to the image data when it is discriminated that the voice data has already been related to the image data.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a view illustrating various kinds of data files stored in a flash memory according to the embodiment;

DETAILED DESCRIPTION OF THE INVENTION

An embodiment of an image recording device according to the present invention will now be described with reference to the accompanying drawings. An embodiment, in which the invention is applied to a digital still camera (hereinafter, called as "digital camera"), will be explained.

FIRST EMBODIMENT

Figure 1:
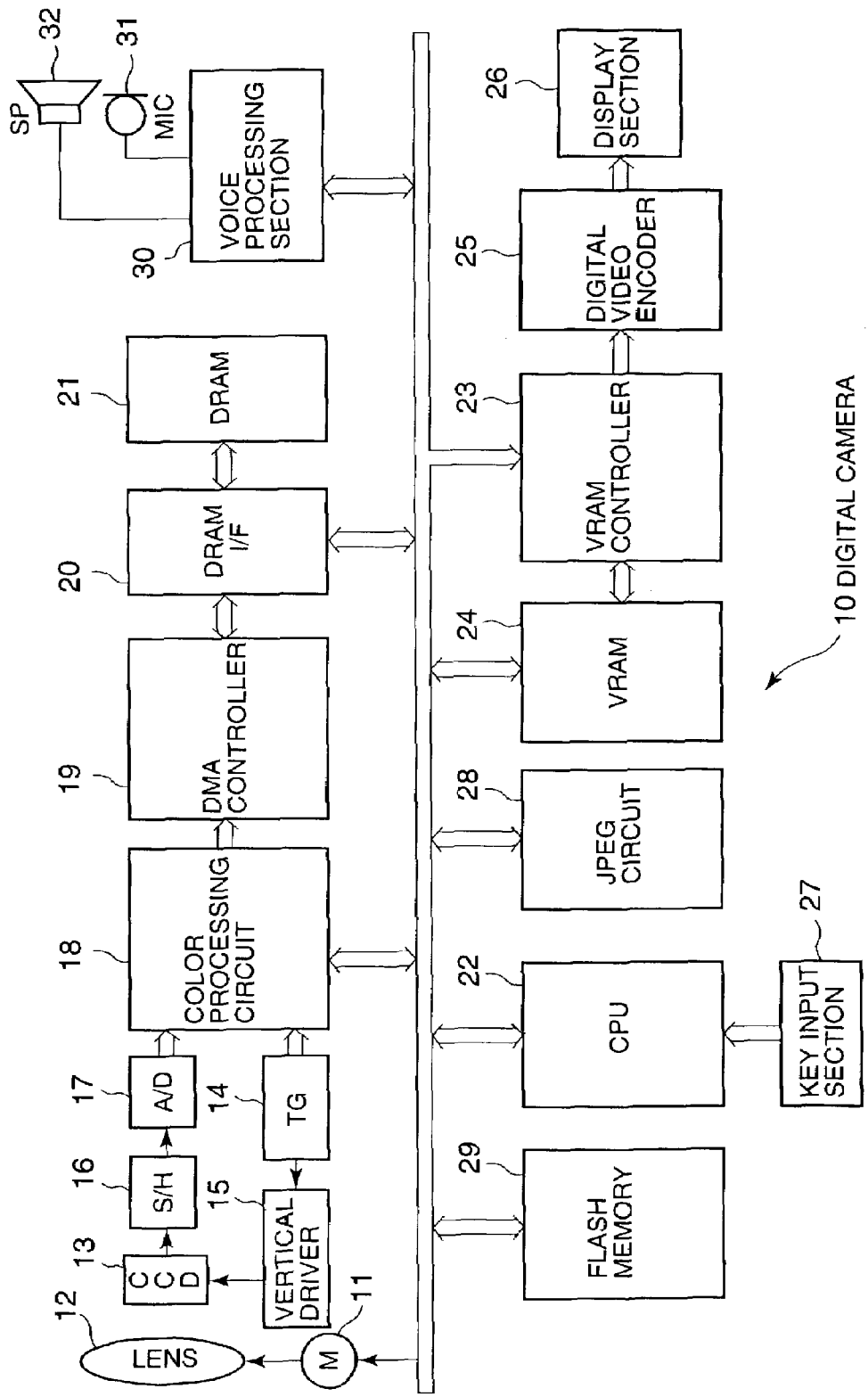
FIG. 1 is a block diagram showing a circuit configuration of a digital camera according to an embodiment of the invention.

FIG. 1 shows a circuit configuration. A digital camera 10 has a basic setting mode which comprises a recording mode and a playback mode to be switched for setting. In a monitoring state of the recording mode, a CCD (image pickup device) 13, which is arranged at the rear part of a pick-up optical axis in an optical system including a focus lens 12 by which a focal point is moved by driving a motor 11, is driven for scanning, using a timing generator (TG) 14, and a vertical driver 15, and one screen of photoelectric conversion output corresponding to an optical image is output at predetermined intervals.

The photoelectric conversion output is sampled and held in a sample-and-hold circuit (S/H) 16 after suitable gain control of each primary color element of RGB in an analog state of a signal and is converted into digital data in an analog to digital converter 17. Thereafter, color-process processing including pixel-interpolation processing and γ-correction processing is executed in a color processing circuit 18 to generate a luminance signal Y, and color-difference signals Cb and Cr as digital signals and to output the digital signals to a DMA (Direct Memory Access) controller 19.

A luminance signal Y, and color-difference signals Cb and Cr, which are output from the color processing circuit 18, are written into a buffer in the DMA controller 19, based on a composite color synchronizing signal, a memory-write enable signal and a clock signal from the color processing circuit 18, and are transferred to a DRAM 21 according to a DMA technology through a DRAM interface (I/F) 20.

A CPU 22 (a processor, discrimination unit, control unit, and inhibiting unit) reads out the luminance and color-difference signals from the DRAM 21 through the DRAM interface 20 after the luminance and color-difference signals are transferred to the DRAM 21 according to the DMA technology and writes the signals into a VRAM 24 through a VRAM controller 23.

A digital video encoder 25 reads out the luminance and color-difference signals from the VRAM 24 through the VRAM controller 23 at regular intervals and generates a video signal, based on the luminance and color-difference signals for output to a display section 26.

The display section 26 (notification unit) comprises, for example, a color liquid crystal display panel with a back light and a driving circuit thereof, is disposed on the back side of the digital camera 10, functions as an EVF (Electronic View Finder) at recording mode. The display section 26 displays an image based on image information which has been supplied from the VRAM controller 23 up to that point, by display based on video signals from the digital video encoder 25.

A trigger signal is generated when, in a state in which an image at that point is displayed on the display section 26 as a monitoring image in real time, a shutter key among a plurality of keys, which form a key input section 27 (instruction unit, selection unit, and forced instruction unit), is operated at a timing when a still picture is required to be picked-up.

The CPU 22 closes a path from the CCD 13 to the DRAM 21 just after transferring of one screen of the luminance and color-difference signals, which have been input from the CCD 13 up to that point according to the above trigger signal, to the DRAM 21 according to the DMA technology is completed, and is changed to a state of recording and saving.

In such a state of recording and saving, the CPU 22 reads out one frame of the luminance and color-difference signals written into the DRAM 21, through the DRAM interface 20 for each component of Y, Cb, and Cr in a unit, called as a basic block, of eight pixels in length×eight pixels in width; writes the above signals into a JPEG circuit 28, in which pieces of the data of the above signals are compressed by processing such as ADCT (Adaptive Discrete Cosine Transform) and Huffman encoding of an entropy encoding method; pieces of the obtained coded data are read out as a data file for one image from the JPEG circuit 28; and the data file is written into a flash memory 29 (storage unit and memory) which is of a nonvolatile memory and is installed in a detachable manner as recording media of the digital camera 10.

The CPU 22 conducts the path from the CCD 13 to the DRAM 21 again after completion of the compression processing of one frame of the luminance and color-difference signals, and writing processing of all pieces of the compressed data into the flash memory 29.

In such a case, image data with remarkably reduced number of component pixels in comparison with that of the original image data is also made in the CPU 22 and the obtained data is stored in the flash memory 29 as a preview image, which is also called as a thumbnail image, in relation with the original image data.

The key input section 27 comprises, other than the above-described shutter key: a REC/PLAY selection key which executes switching between a recording (REC) mode and a playback (PLAY) one of a basic mode; a "menu" key which displays various kinds of menu items; a cross key which instructs a direction such as an upper, lower, right or left direction for selection of images and various kinds of modes, specification of the menu selection item, and the like; a "set" key which is arranged at the center part of the cross key and executes setting for instruction to execute the content which has been selected up to that point, and the like. Signals caused by operation of the above keys are sent directly to the CPU 22.

Moreover, a voice processing section 30 is connected to the CPU 22, and a microphone (MIC) 31 (voice input unit) and a speaker (SP) 32 are connected to the voice processing section 30.

That is, the digital camera 10 executes not only recording/playback operation of images, but also that of voices by arbitrary setting. At the recording mode, voices input from the microphone 31 are converted into digital voice data in the voice processing section 30 by PCM (pulse code modulation) coding processing and the data is recorded in the flash memory 29. At the playback mode, the voice data which the CPU 22 has read out from the flash memory 29 is converted into analog data in the voice processing section 30 and the analog data is converted into voices by a speaker 32.

However, modes such as a movie mode, a still-picture-with-voices mode, a still-picture-without-voices mode, and a voice memorandum mode may be arbitrarily selected at the recording mode of the basic mode.

At the movie mode, a full motion video with voices is picked-up, and a movie data file including full-motion-video data and voice data, which have been obtained between the point of operation of the above-described shutter key and the point when the longest elapsed time of, for example, 30 seconds has passed, or between the above shutter-key operation point and the subsequent shutter-key operation point before the longest elapsed time is passed, is made for recording in the flash memory 29. In such a case, a data file for the preview image is automatically made from the still image data which is the top image among full-motion-video images and is recorded in the flash memory 29 in relation with the movie data file.

At the still-picture-with-voices mode, a still picture with voices is picked-up, and a still-picture-with-voices data file including still image data obtained by operation of the above-described shutter key and voice data, which has been obtained between the point of operation of the above-described shutter key and the point when the longest elapsed time of, for example, 30 seconds has passed, or between the above shutter-key operation point and the subsequent shutter-key operation point before the longest elapsed time is passed, is made and is recorded in the flash memory 29. In such a case, a data file for the preview image is automatically made from the still image data and is recorded in the flash memory 29 in relation with the still-picture-with-voices data file.

At the still-picture-without-voices mode, a still picture without voices is picked-up, and a still-picture-without-voices data file including only still image data obtained by the shutter key operation is made and is recorded in the flash memory 29. In such a case, a data file for the preview image is automatically made from the still image data and is recorded in the flash memory 29 in relation with the still-picture-without-voices data file.

At the voice memorandum mode, only sound-recording of voices is executed, and a voice-memorandum data file including voice data, which has been obtained between the point of operation of the above-described shutter key, by which recording of the voices are simultaneously started, and the point when the longest elapsed time of, for example, 30 seconds has passed, or between the above shutter-key operation point and the simultaneous starting operation, and the subsequent shutter-key operation point before the longest elapsed time has passed, is made and is recorded in the flash memory 29.

FIG. 2 illustrates states of various kinds of data files which have been recorded in the flash memory 29. Here, the file number of the last data file among the data files which have been recorded in the flash memory 29 is assumed to be a variable "m" for management.

Moreover, the protect states of the data files which have been recorded in the flash memory 29 are configured to be independently or collectively set in an arbitrary manner. In such a case, with regard to data files for which the protect state is set as "ON", the playback function may be freely executed, but requests for deletion, partial rewriting, or addition of data, by which the after-described still-picture-without-voices data file is converted into a still-picture-with-voices data file, using the post-recording function, are not accepted at all.

Then, the operations of the above-described embodiment will be explained.

Figure 3:
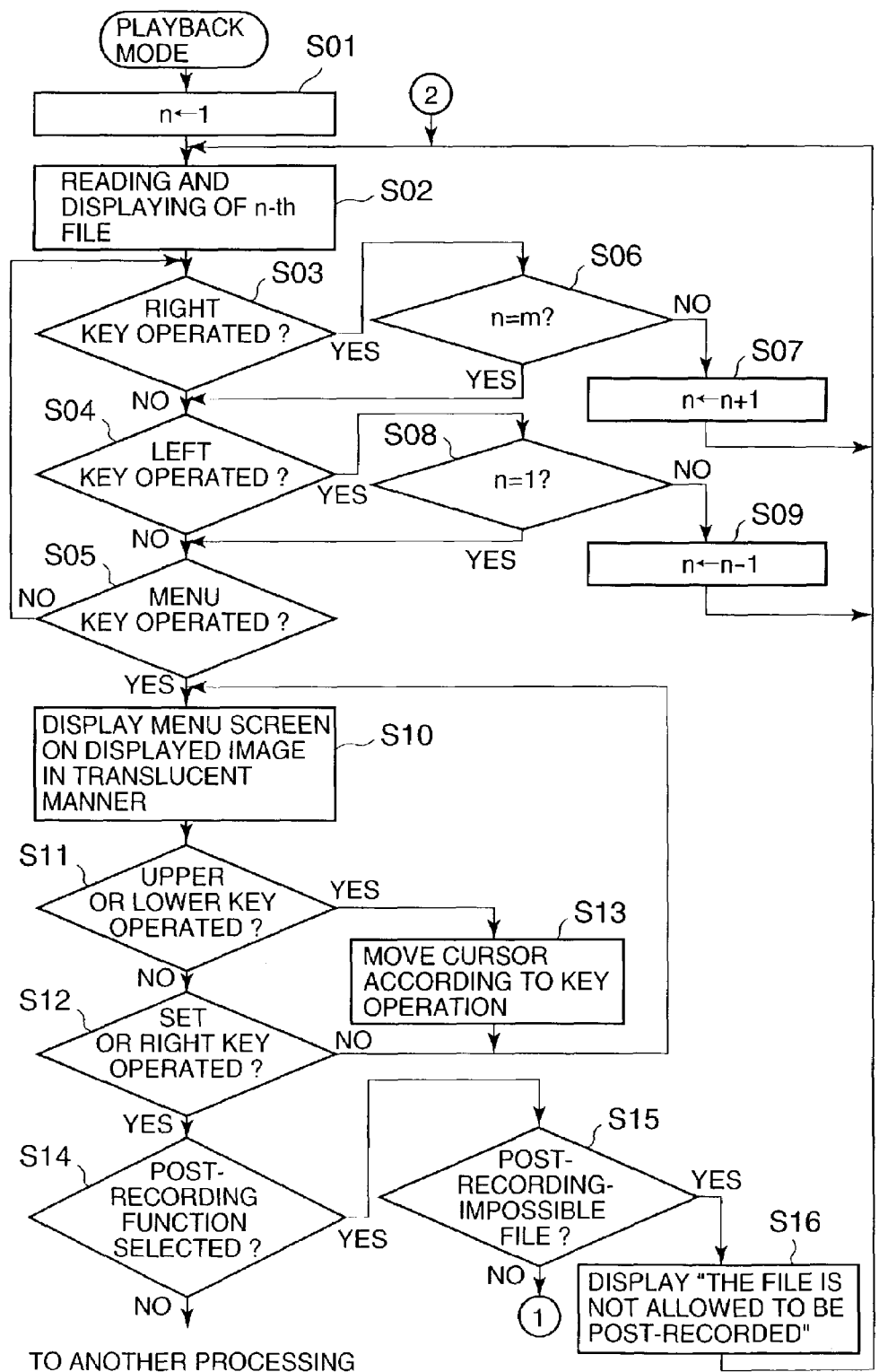
FIG. 3 is a flow chart showing a part of processing at a playback mode according to the embodiment.
Figure 4:
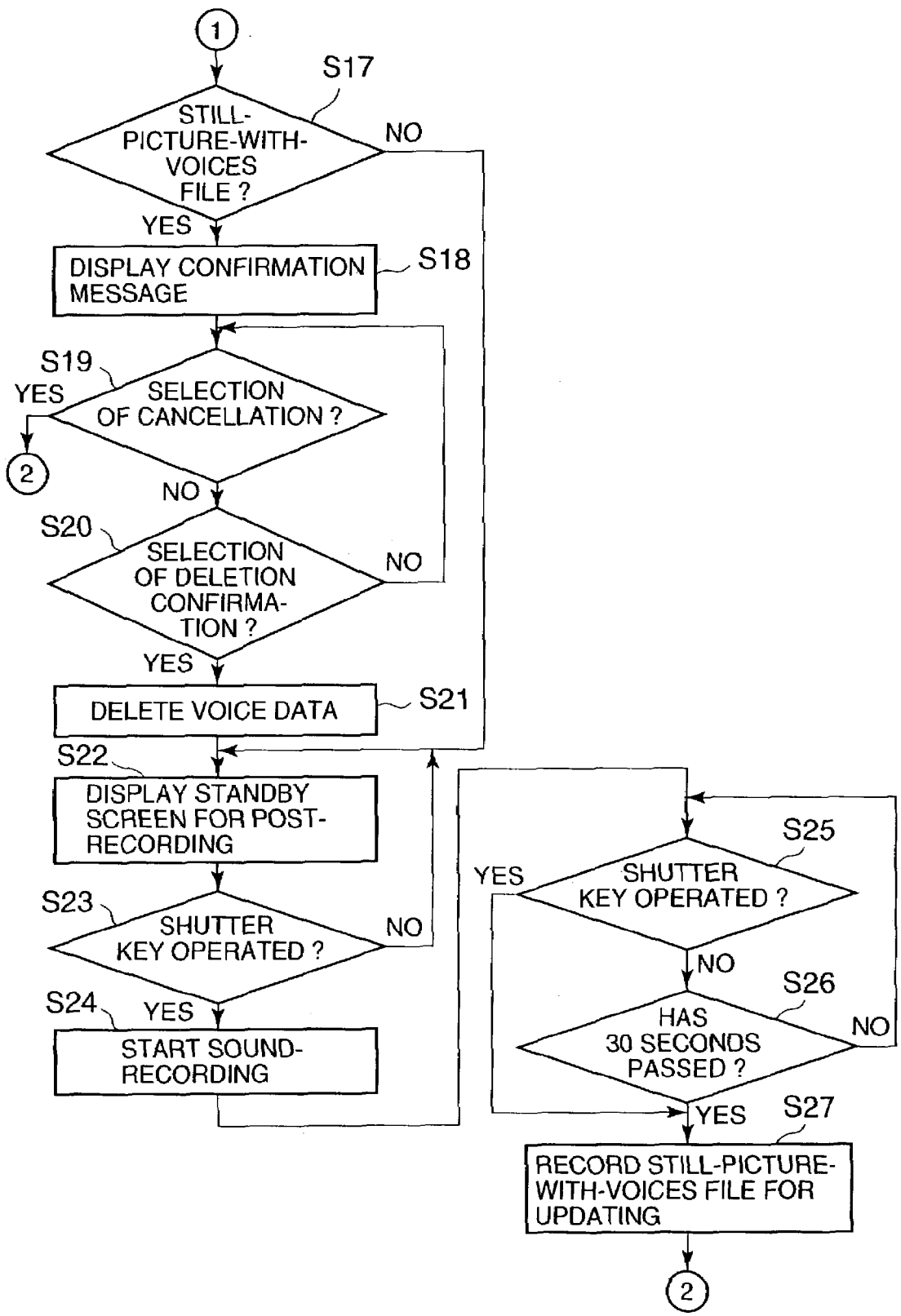
FIG. 4 is a flow chart showing another part of processing at a playback mode according to the embodiment.

FIGS. 3 and 4 show processing at the playback mode, especially, the post-recording function.

The initial value of a variable "n" for searching a data file which has been recorded in the flash memory 29 is set as "1" in step S01. Then, an n-th data file is specified according to the variable "n", is read out from the flash memory 29, and is output for playback mainly in the display section 26 in step S02.

When the data file read out from the flash memory 29 is a full-motion-video data file, the data file for a preview image, which has been recorded in the flash memory 29 in relation with the full-motion-video data file, is expanded, and is output for display in the display section 26.

When the data file read out from the flash memory 29 is a still-image-with-voices data file, the data file for a preview image, which has been recorded in the flash memory 29 in relation with the still-image-with-voices data file, is expanded, and is output for display in the display section 26.

In this case, a symbol mark which expresses a data file with voice data is also displayed at a specific position in the preview image, for example, in the upper central part of the screen.

When the data file read out from the flash memory 29 is a still-image-without-voices data file, the data file for a preview image, which has been recorded in the flash memory in relation with the still-image data file, is expanded, and is output for display in the display section 26.

In this case, the symbol mark which expresses a data file with voice data is not displayed, as there is no voice data.

When the data file read out from the flash memory 29 is a voice-memorandum data file (voice data file), which has been recorded at the above-described voice memorandum mode, only a symbol mark which expresses a voice data is displayed at a specific position on a screen in the display section 26, for example, in the upper central part of the screen.

Under a state in which display is executed, as described above, according to the n-th data file which has been recorded in the flash memory 29, operation of any one of the following keys is waited for, while the following determinations are executed one after another: It is determined in step S03 whether a right key of the cross key in the key input section 27 is operated or not; in step S04 whether a left key in the same cross key is operated or not; and in step S05 whether a "menu" key is operated or not.

When it is determined in step S03 that the right key of the cross key is operated, it is confirmed in step S06, assuming that the next data file recorded in the flash memory 29 is specified, that the value of the variable "n" at that point has not already become the variable "m" expressing the file number of the last data file, the value of the relevant variable "n" is updated by "+1" for setting in step S07, and, then, the processing is returned to step S02 at which the next data file is displayed.

When it is determined in step S06 that the value of the variable "n" at that point has already become the variable "m", the operation of the right key of the above-described cross key is made void, as the variable "n" may not be further updated for setting, and then, the processing is returned to the above-described step S04.

When it is determined in step S04 that the left key of the cross key is operated, it is confirmed in step S08, assuming that the previous data file recorded in the flash memory 29 is specified, that the value of the variable "n" at that point has not already become a numerical value "1" expressing the top file number of the data file, the value of the relevant variable "n" is updated by "−1" for setting in step S09, and, then, the processing is returned to step S02 at which the above previous data file is displayed.

When it is determined in step S08 that the value of the variable "n" at that point has already become a numerical value "1", the operation of the left key of the above-described cross key is made void, as the variable "n" may not be further updated for setting, and, then, the processing is returned to the above-described step S05.

When it is determined in step S05 that the "menu" key is operated, operation of any one of the following keys is waited for, while the following determinations are executed one after another: it is determined in step S11 whether the upper or lower key of the cross key in the key input section 27 is operated or not; and in step S12 whether the right key of the cross key, or the "set" key located at the center of the cross key is operated or not, under a state in which a menu screen is displayed in step S10 on an image displayed in the display section 26 at that point in a superposed and translucent manner.

Figure 5:
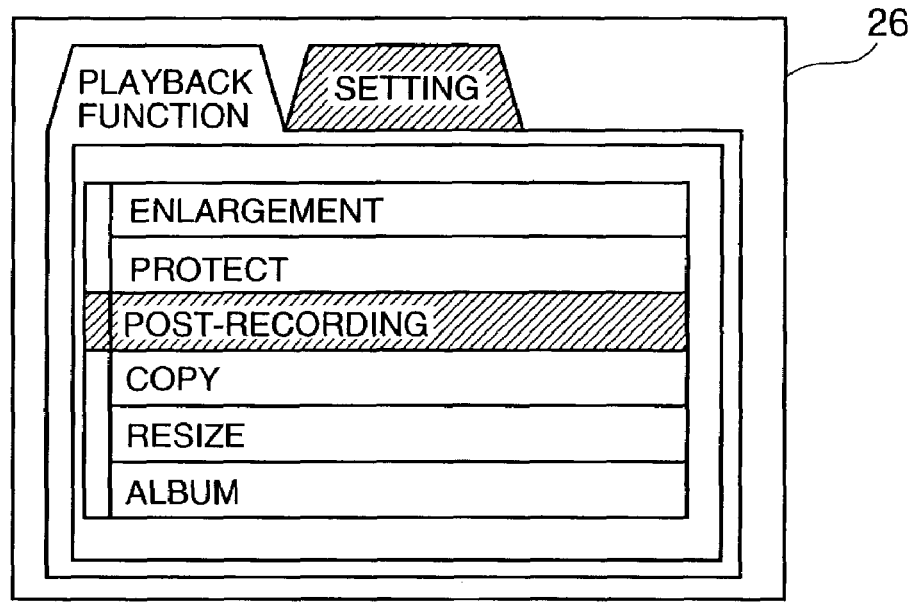
FIG. 5 is a view illustrating a part of screen at a playback mode according to the embodiment.

FIG. 5 illustrates a menu screen displayed on the display section 26. Here, two tabs of "playback function" and "set" are displayed, wherein it is shown that, when the tab of "playback function" of the above two tabs is selected, the following items are listed as menu items of "playback function": "enlargement" to enlarge a part of a displayed image; "protect" to change the protected state of a data file; "postrecording" to add and record voice data to a data file of a still image; "copy" to copy a data file which has been already recorded; "resize" to change the number of component pixels of a still image data in the still-picture data file; and "album" to execute making/editing of a folder in which data files recorded in the flash memory 29 are organized, and "postrecording" among the above items has been selected with the cursor.

When it is determined in step S11 that the upper or lower key of the cross key is operated, the cursor is moved in step S13 from the menu item which has been selected at that point with the cursor to a menu item corresponding to the content of the operated key and the processing is returned to step S10.

When it is determined in step S12 that the right key or "set" key of the cross key is operated, it is determined in step S14 whether the menu item, which has been selected with the cursor up to that point for the subsequent execution, is "post-recording" or not.

When a right or "set" key of the cross key is operated under a state in which a menu item other than "post-recording" is selected, explanation will be eliminated, as this case is not directly related with the present embodiment.

When it is determined in step S14 that the "post-recording" has been selected, it is determined in step S15 whether the data file which has been selected just before the next operation of the above-described "menu" key is a data file for which the post-recording function may not be executed.

When the data file which has been selected is a voice-memorandum data file recorded at the voice memorandum mode, a full-motion-video data file recorded at the movie mode, or, a data file for which the above-described protect state is set as "ON", it is determined that the selected data file is a data file for which the post-recording function may not be executed.

Then, when the selected data file is a data file for which the post-recording function may not be executed, it is notified in step S16 by displaying a character message, which says, for example, "post-recording function can not be applied", in a superposed manner under a state in which a data file selected just before operation of the "menu" key is displayed, that the post-recording function may not be executed, determining from the kind of the file, and, thereafter, the processing is returned to a state in step S02 in which a selected data file is displayed.

When it is determined in step S15 that the data file which has been selected just before operation of the "menu" key is a data file for which the post-recording function may be executed, the data file is at least a still-image data file regardless of the existence of the voices and is under a state in which the above-described protect state is not set as "ON." Accordingly, it is determined in step S17 following the step S15 whether the still-image data file is a still-picture data file with voices or not.

When it is determined that the still-image data file is a still-picture data file with voices, a message which confirms whether the audio data corresponding to the voices is deleted from the still-picture data file and new audio data is required to be recorded by the post-recording function or not is displayed in step S18. Thereafter, operation of any one of the following keys is waited for, while the following determinations are executed one after another: It is determined in step S19 whether cancellation of the post-recording function is selected or not; and in step S20 whether deletion of the voice data in the still-picture data file is selected or not.

Figure 6:
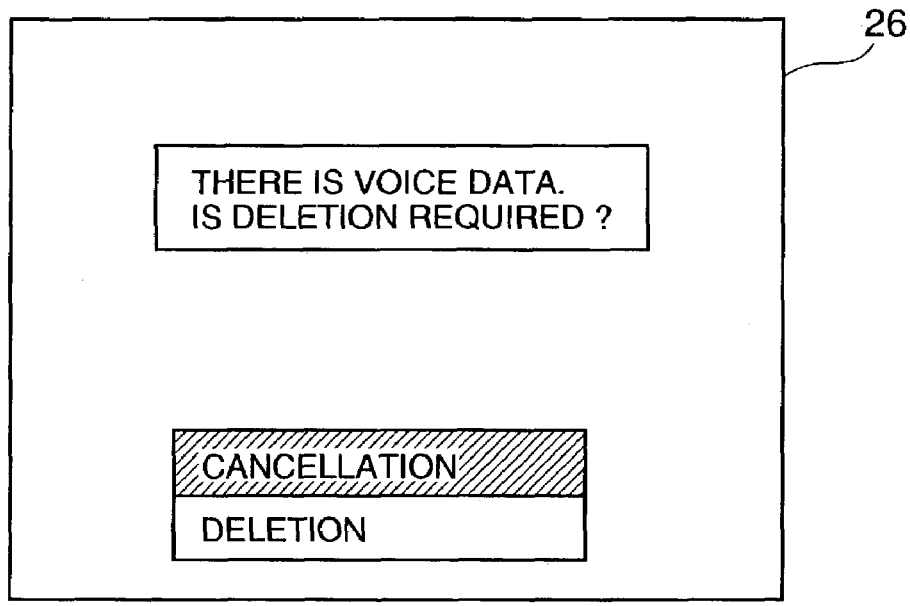
FIG. 6 is a view illustrating another part of screen at a playback mode according to the embodiment.

FIG. 6 illustrates a message screen for confirmation displayed on the display section 26 at this point, wherein a message saying, for example, "There is voice data. Is the data required to be deleted?" is displayed at rather upper and central part of the screen and, at the same time, two options of "cancellation" and "deletion" are displayed at the lower part of the screen. Here, it is shown that "cancellation" is selected with the cursor. And, an instruction for selection is executed by operation of the "set" key after the cursor is moved to an arbitrary direction, operating the upper or lower key of the cross key.

When "cancellation" is selected as an instruction in step S19, the processing is returned to a state in step S02 in which a selected data file is displayed.

When "deletion" is selected as an instruction in step S20, the voice data in the still-picture data file is deleted from the flash memory 29 according to the instruction in step S21.

When it is determined in step S17 that the still-image data file is not a still-picture data file with voices, but one without voices, pieces of processing in steps S18 through S21 are not executed, as they are not required.

Thereafter, a standby screen for the post-recording function is displayed on the display section 26 in step S22 and, then, operation of the shutter key which starts sound-recording is waited for.

Figure 7:
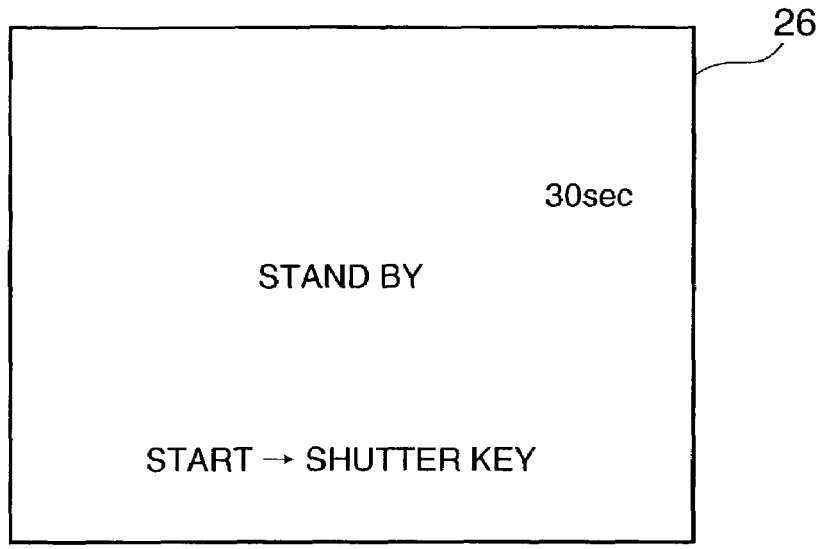
FIG. 7 is a view illustrating further part of screen at a playback mode according to the embodiment.

FIG. 7 illustrates the standby screen, wherein characters of "STAND BY" are displayed at the center of the screen, it is shown at the right side of the upper part that the longest sound-recording time is 30 seconds, and also at the lower part of the screen that "START" of the sound-recording may be executed by operation of the shutter key.

When the shutter key is operated in step S23, the operation of the sound-recording with the microphone 31 is started in step S24.

Figure 8:
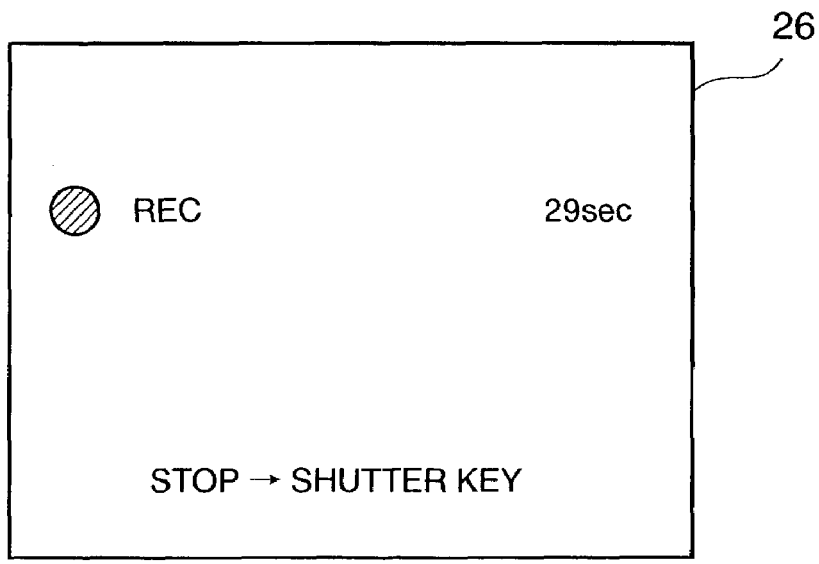
FIG. 8 is a view illustrating still another part of screen at a playback mode according to the embodiment.

FIG. 8 illustrates a display screen in the display section 26 just after starting the sound-recording. A, for example, red-colored round sign and characters "REC", which indicate an indicator for showing a state "under sound-recording", are shown in the central and rather upper part of the screen and it is also shown thereon that the remaining time for recording is 29 seconds. Moreover, it is shown at the lower part of the screen that "STOP" of the sound-recording may be realized by operation of the shutter key.

Under executing of sound-recording as described above, the following determinations are executed one after another. It is determined in step S25 whether the shutter key is operated again or not; and in step S26 whether 30 seconds have passed from the starting of the sound-recording.

When the shutter key is operated again, or when the predetermined time of 30 seconds has passed with no operation of the shutter key, the above progress is determined in step S25 or S26, the sound-recording is stopped in step S27, a series of input voices are converted into voice data, the obtained voice data is attached in a still-image data file corresponding to the new voice data; and the obtained still-image data file with the attached voice data is stored as a still-picture data file with voices in the flash memory 29 for updating. Thereafter, the processing is returned to a state in step S02 in which a selected data file is displayed.

Figure 9:
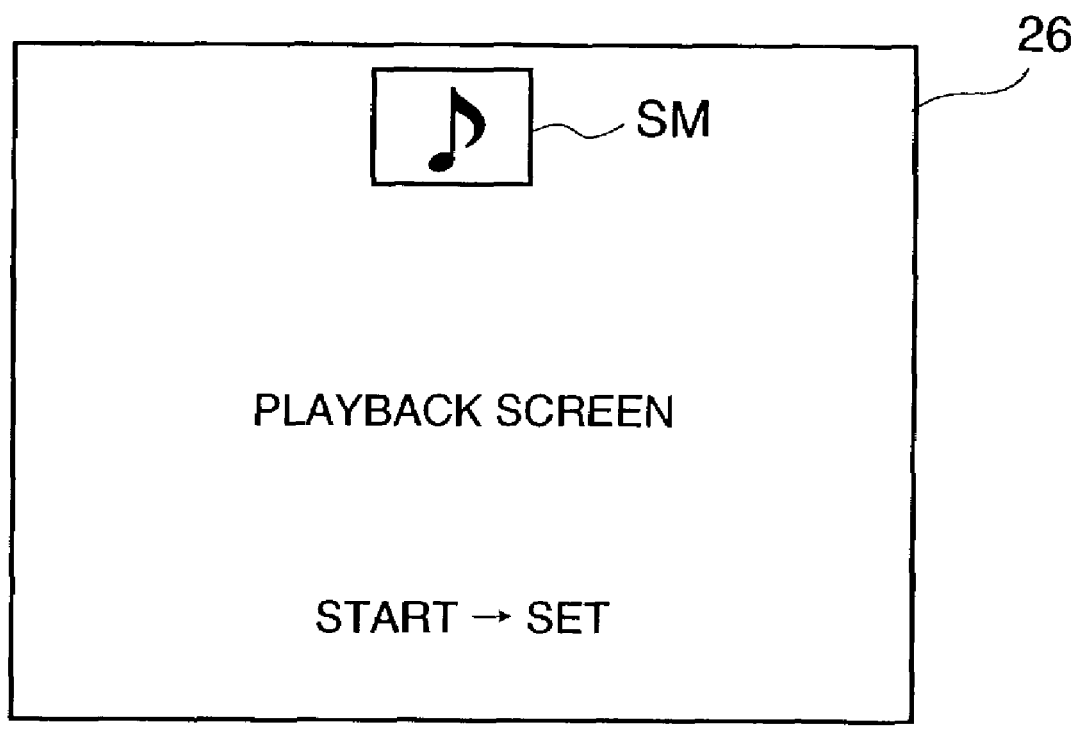
FIG. 9 is a view illustrating yet another part of screen at a playback mode according to the embodiment.

FIG. 9 shows a state in which the processing is returned to display of a still image as described above. In the upper part of the screen, a symbol mark SM using a note expresses that a still-image data file includes voice data.

In the above example, it is selected by a user, after a message that the voice data has been already attached is displayed, whether the voice data is deleted to continue application of the post-recording function, or setting the post-recording function is cancelled, when the voice data has been already included in a still-image data file to which the post-recording function is required to be applied, has been explained in the above-described embodiment. But, application of the invention is not limited to the above example and the present invention can be applied to another example in which setting of the post-recording function is unconditionally cancelled when the post-recording function is applied to a still-image data file to which voice data has already been attached.

Figure 10:
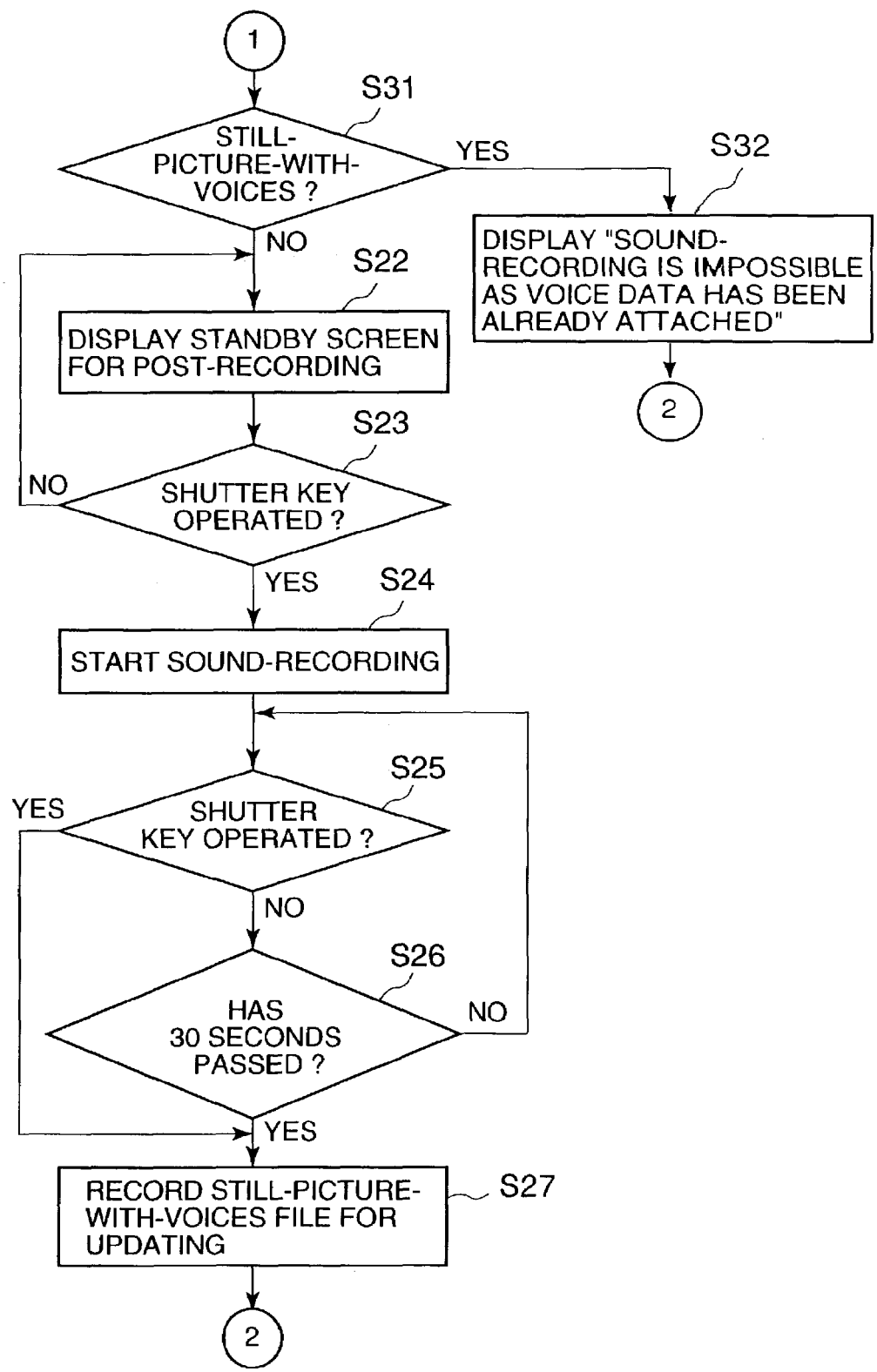
FIG. 10 is a flow chart showing another part of processing at a playback mode according to the embodiment.

FIG. 10 shows a part of another example, which is used instead of FIG. 4, for the post-recording function. When it is determined in step S31 whether the still-image data file which has been selected has one with voices or not, and the result is that the data file is a still-picture data file with voices, a message saying, for example, "The post-recording function can not be executed as voice data has been already recorded" is displayed on the display section 26 in step S32 in order to express that additional sound-recording can not be executed as voice data has been already recorded. Thereafter, the processing is returned to a state in step S02 in which a selected data file is displayed.

In the above description, the voice data is attached (included) in the still-picture data file (movie data file), but a voice data file including voice data may be separately made and recorded in the flash memory 29 in relation with the still-picture data file. For example, if the file name of a still-image data file is assumed to be "20020331123456.jpg", a corresponding voice data file with the file name of "20020331123456.wav" is separately made, and they are linked with each other in the flash memory 29 by having a common file name though those extensions are different from each other.

Though the data file of the preview image has been recorded in relation with the still-picture data file (movie data file) in the above-described embodiment, the preview-image data may be attached in the still-picture data file.

When it is assumed that the post-recording function is selected and specified for the selected still-image data file and the post-recording function is executed by sound-recording, an alarm is displayed if the still-image data file has already had the voice data. But, when the post-recording function is executed before selecting a still-image data file, using the voice data for which sound-recording has been completed, the alarm is displayed at the point when the still-image data file is selected and an instruction to attach the voice data which has been already recorded to the selected still-image data file is issued.

Though the alarm for the post-recording function of the still-image data file with voices is executed by displaying the message on the display section 26 in the above-described embodiment, a voice message for alarming may be converted into voices by a speaker 32 independently or in a simultaneous manner with the message display.

The above embodiment is applied to a digital camera (electronic still camera), but the invention is not limited to the above embodiment and can be easily applied as another case to a cellular telephone terminal with a camera function, a PDA (Personal Digital Assistant) with a camera function, a personal computer with a camera function, a full-motion-video camera and the like. In short, the invention may be applied to any devices, if the camera function and the post-recording function are installed in the devices.

Further, the invention may be also applied to an image recording device, an image playback device and the like, in which a pick-up function is not installed. For example, a memory card comprising the flash memory 29 may be removed from an electronic still camera and installed in another image recording device or image playback device, or a still-image data file which has been recorded in the flash memory 29 in the electronic still camera may be transmitted to an external image recording device by cable or wireless. Furthermore, an electronic still camera provided with the flash memory 29 may be connected to an external device such as another image recording device and image playback device by cable/wireless, the still-image data file which has been recorded in the flash memory 29 once may be read from the external device, and voice data may be set to be attached to the read still-image data file and may be sent back to the flash memory 29 for updating and recording. The post-recording function according to the invention may be executed at the side of the electronic still camera or the external device even when the sound-recording function is not provided in the side of the electronic still camera.

The invention may be applied to a digital camera, in which the still-picture-with-voices mode is installed. The invention may be also applied to a digital camera without the still-picture-with-voices mode. For example, the post-recording function may be executed again for the still-picture data file with voices, to which voices have been already attached by execution of the post-recording function for the still-picture data file without voices obtained by picking-up at the still-picture-without-voices mode. Furthermore, in such a case, the invention may be also applied to an image recording device without the pick-up function, if a still-picture-without-voices data file has been recorded in a memory and the post-recording function is installed.

Further, the invention may be also applied to a case in which the post-recording function is executed for a full-motion-video data file, instead of the still-picture data file.

The invention may be also applied to a digital camera without the sound-recording function. For example, plural pieces of voice data may be stored in a memory, and the voice data which is selected by a user from the plural pieces of voice data stored in the memory may be attached to the still-picture data file when the post-recording function is executed for the still-picture data file. In addition, in such a case, the invention may be also applied to an image recording device without the pick-up function, if a still-picture data file has been recorded in a memory and the post-recording function which does not require the above-described sound-recording function is installed.

In the above-described embodiment, when the post-recording function is selected for the still-image data file without voices, or when the post-recording function is selected for the still-image data file with voices, a message that the voice data has been already recorded is displayed and an instruction to delete the voice data is given, responding to the message, the post-recording function is put into a standby state, and, thereafter, sound-recording is started by operation of the shutter key. But, another configuration, in which the above-described standby state of the post-recording function is not provided, and the sound-recording operation by the post-recording function is immediately started when the post-recording function is selected for the still-image data file without voices, or when an instruction to delete the voice data is given, may be applied.

Though the post-recording function is selected after a still-image data file is selected in the above-described embodiment, a still-image data file for which the post-recording function is to be executed may be selected after the post-recording function is selected.

In such a case, a message for alarming and the like as described above may be notified at the point when a still-image data file to which the post-recording function is applied is selected, depending on whether the selected still-image data file is a still-picture data file with voices or not.

Furthermore, execution of the post-recording function (shift to display of a screen for standby of the "post-recording function") is temporary or completely inhibited in the above embodiment when the post-recording function is selected for a still-image data file with voices. But only notification to tell that voice data in a still-image data file with voices is deleted may be executed without inhibiting execution of the post-recording function in the same manner as that of the case in which the post-recording function is selected for the still-image data file without voices.

What is claimed is:

1. A data recording device comprising:
   a memory which stores data files;

a selection unit which selects one of the data files stored in the memory;

an instruction unit which issues an instruction at an arbitrary timing to relate audio data to the selected data file;

a first determination unit which determines whether the instruction unit has issued the instruction to relate the audio data to the selected file;

a second determination unit which determines whether the selected data file is a kind of data file to which audio data is not permitted to be related, when the first determination unit determines that the instruction unit has issued the instruction;

an inhibiting unit which inhibits the audio data from being related to the selected data file when the second determination unit determines that the selected data file is the kind of data file to which audio data is not permitted to be related;

a notifying unit which performs a first notification operation when the second determination unit determines that the selected data file is the kind of data file to which audio data is not permitted to be related;

a third determination unit which determines whether audio data is already related to the selected data file when the second determination unit determines that the selected data file is a kind of data file to which audio data is permitted to be related; and a control unit which executes processing to relate the audio data to the selected data file when the third determination unit determines that audio data is not already related to the selected data file;

wherein the notifying unit performs a second notification operation, which is different from the first notification operation, when the third determination unit determines that audio data is already related to the selected data file.

2. The data recording device according to claim 1, wherein the instruction unit is operable to issue instructions to perform a plurality of types of processing, and one of said plurality of types of processing is the relation of audio data to the selected data file; and wherein, when an instruction is issued via the instruction unit, the first determination unit determines whether the issued instruction is the instruction to relate audio data to the selected data file.

3. The data recording device according to claim 2, further comprising a display control unit which displays in a list, on a display unit, items of processing information corresponding respectively to said plurality of types of processing;

wherein the instruction unit comprises a processing selection unit which selects one of the items of processing information displayed on the display unit and which instructs execution of the type of processing corresponding to the selected item of processing information.

4. The data recording device according to claim 1, wherein the third determination unit determines whether audio data is already related to the selected data file by determining whether audio data is included in the selected data file; and wherein the control unit executes the processing to relate the audio data to the selected data file by executing processing to include the audio data in the selected data file when the third determination unit determines that audio data is not included in the selected data file.

5. The data recording device according to claim 1, wherein the third determination unit determines whether audio data is already related to the selected data file by determining whether an audio file is recorded in relation to the selected data file; and wherein the control unit executes the processing to relate the audio data to the selected data file by executing processing to store an audio file of the audio data in relation to the selected data file when the third determination unit determines that an audio file is not recorded in relation to the selected data file.

6. The data recording device according to claim 1, wherein the kind of data file to which audio data is not permitted to be related comprises at least one of an audio file, a motion picture file, and a data file that is set in a protected state.

7. The data recording device according to claim 1, wherein the kind of data file to which audio data is permitted to be related comprises a still image data file that is not set in a protected state.

8. The data recording device according to claim 1, further comprising:

a forced instruction unit which is operable to instruct a forced execution by the control unit of the processing to relate the audio data to the selected data file when the third determination unit determines that audio data is already related to the selected data file.

9. The data recording device according to claim 8, wherein the memory stores the selected data file to which the audio data is related by the control unit.

10. The data recording device according to claim 1, wherein the inhibiting unit inhibits the audio data from being related to the selected data file when the third determination unit determines that audio data is already related to the selected data file.

11. The data recording device according to claim 1, wherein the control unit is operable to execute processing to relate the audio data to the selected data file as new audio data in place of the audio data already related to the selected data file when the third determination unit determines that audio data is already related to the selected data file.

12. The data recording device according to claim 1, further comprising an audio input unit via which the audio data is input, wherein the instruction unit instructs the audio data input via the audio input unit to be related to the selected data file.

13. The data recording device according to claim 1, wherein the memory stores the selected data file to which the audio data is related by the control unit.

14. The data recording device according to claim 1, further comprising an audio input unit via which the audio data is input;

wherein the control unit shifts an operation mode of the data recording device to an audio-recording mode in which recording of the audio data input via the audio input unit is executed, when the third determination unit determines that audio data is not already related to the selected data file; and wherein the memory stores the selected data file to which the audio data recorded in the audio-recording mode is related.

15. The data recording device according to claim 1, further comprising an image pickup unit which obtains image data, wherein the obtained image data is stored in the memory as a data file.

16. The data recording device according to claim 15, further comprising an audio input unit via which audio data is input;

wherein the audio data input through the audio input unit at a time of obtaining the image data is stored in the memory as another data file in relation to the image data.

17. A digital camera comprising:
an image pickup unit which obtains items of image data;
a memory which stores the items of image data obtained by the image pickup unit;
a selection unit which selects one of the items of image data stored in the memory;
an instruction unit which issues an instruction at an arbitrary timing to relate audio data to the selected item of image data;
a first determination unit which determines whether the instruction unit has issued the instruction to relate audio data to the selected item of image data;
a second determination unit which determines whether the selected item of image data is a kind of image data to which audio data is not permitted to be related, when the first determination unit determines that the instruction unit has issued the instruction;
an inhibiting unit which inhibits the audio data from being related to the selected item of image data when the second determination unit determines that the selected item of image data is the kind of image data to which audio data is not permitted to be related;
a notifying unit which performs a first notification operation when the second determination unit determines that the selected item of image data is the kind of image data to which audio data is not permitted to be related;
a third determination unit which determines whether audio data is already related to the selected item of image data when the second determination unit determines that the selected item of image data is a kind of image data to which audio data is permitted to be related; and
a control unit which executes processing to relate the audio data to the selected item of image data when the third determination unit determines that audio data is not already related to the selected item of image data;
wherein the notifying unit performs a second notification operation, which is different from the first notification operation, when the third determination unit determines that audio data is already related to the selected item of image data.

18. A data recording method, comprising:
selecting one of data files stored in a memory;
issuing an instruction at an arbitrary timing to relate audio data to the selected data file;
determining whether the instruction is issued;
determining whether the selected data file is a kind of data file to which audio data is not permitted to be related when it is determined that the instruction is issued;
inhibiting the audio data from being related to the selected data file when it is determined that the selected data file is the kind of data file to which audio data is not permitted to be related;
performing a first notification operation when it is determined that the selected data file is the kind of data file to which audio data is not permitted to be related;
determining whether audio data is related to the selected data file when it is determined that the selected data file is a kind of data file to which audio data is permitted to be related;
relating the audio data to the selected data file when it is determined that audio data is not related to the selected data file; and
performing a second notification operation, which is different from the first notification operation, when it is determined that audio data is already related to the selected data file.

19. A computer readable storage medium having a computer program stored thereon to control a computer to perform operations comprising:
selecting one of data files stored in a memory;
issuing an instruction at an arbitrary timing to relate audio data to the selected data file;
determining whether the instruction is issued;
determining whether the selected data file is a kind of data file to which audio data is not permitted to be related when it is determined that the instruction is issued;
inhibiting the audio data from being related to the selected data file when it is determined that the selected data file is the kind of data file to which audio data is not permitted to be related;
performing a first notification operation when it is determined that the selected data file is the kind of data file to which audio data is not permitted to be related;
determining whether audio data is related to the selected data file when it is determined that the selected data file is a kind of data file to which audio data is permitted to be related;
relating the audio data to the selected data file when it is determined that audio data is not related to the selected data file; and
performing a second notification operation, which is different from the first notification operation when it is determined that audio data is already related to the selected data file.

* * * * *